June 21, 1966  J. M. BOOTH  3,256,784
APPARATUS FOR POSITIONING NESTED CONTAINERS
Filed April 15, 1963  6 Sheets-Sheet 1

Inventor
John Morton Booth
By Stevens, Davis, Miller & Mosher
Attorneys

June 21, 1966   J. M. BOOTH   3,256,784
APPARATUS FOR POSITIONING NESTED CONTAINERS
Filed April 15, 1963   6 Sheets-Sheet 3

Inventor
John Morton Booth
By Stevens, Davis, Miller & Mosher
Attorneys

June 21, 1966  J. M. BOOTH  3,256,784
APPARATUS FOR POSITIONING NESTED CONTAINERS
Filed April 15, 1963  6 Sheets-Sheet 4

June 21, 1966  J. M. BOOTH  3,256,784
APPARATUS FOR POSITIONING NESTED CONTAINERS
Filed April 15, 1963  6 Sheets-Sheet 5

Inventor
John Morton Booth
By Stevens Davis, Miller & Mosher
Attorneys

United States Patent Office 3,256,784
Patented June 21, 1966

3,256,784
APPARATUS FOR POSITIONING NESTED CONTAINERS
John Morton Booth, Rockingham, Halifax, Nova Scotia, Canada, assignor to Moirs Limited, Halifax, Nova Scotia, Canada, a body corporate and politic
Filed Apr. 15, 1963, Ser. No. 273,133
Claims priority, application Canada, Feb. 11, 1963, 868,522
27 Claims. (Cl. 93—37)

This invention relates to a machine for individually positioning a plurality of cohesive nested containers on a supporting surface and more particularly to a machine for individually positioning deformable containers such as fluted paper cups used to hold and separate chocolates packed in a box, from nested stacks of the deformable containers or fluted paper cups.

In the chocolate industry, chocolates are normally packed in fluted paper cups and placed in boxes which pass in front of the packagers on a conveyor belt. The operation heretofore has been manually performed by a packager reaching for a chocolate with the right hand while the first two fingers of the left hand rub across a nested stack of paper cups held on the left thumb, thus removing one cup. The cup is then slid into the left palm. Meanwhile the right hand has grasped the chocolate and transported it to the cup. The right hand then positions the chocolate in the cup, grasps cup and chocolate and transfers them to the proper position in the box. This time consuming process is then repeated.

The work output of a packager can be substantially increased if the cups are preplaced in required position in the boxes, or on layer cards which are used to separate layers of chocolates in the boxes, thereby permitting the packager to use both hands simultaneously to grasp and position chocolates in the cups in the boxes or in the cups on the layer cards. In applicant's copending Canadian Patent Application Serial No. 818,585 filed on March 8, 1961, entitled "Device for Positioning Nested Cups," a number of normally hand-operated positioning devices were disclosed and claimed and some of these devices were suitable or adaptable as part of a machine designed to perform the function of positioning the fluted paper cups. This invention relates to the machine itself, and the method of its operation.

A method of positioning a plurality of containers on layer cards or the like in accordance with the present invention comprises the steps of severing layer cards from a web of layer card material one surface of which is coated with a dried glue, causing the glue to become tacky, depositing a plurality of containers on the glue tacky surface of the severed layer cards and thereafter allowing said glue to dry to adhere the containers to the layer cards.

Apparatus for positioning a plurality of containers on layer cards or the like in accordance with the present invention comprises means for supporting and locating a web of layer card material, the upper surface of said web having a coating of dried glue thereon, severing means for cutting layer cards of predetermined length from said web, means to cause the dried glue to become tacky and means for depositing a plurality of containers on the glue tacky surface of the layer cards.

In drawings which illustrate an embodiment of the invention,

FIGURE 7b is an exploded perspective view of the mandrel assembly of FIGURE 7a.

FIGURE 9 is a detailed perspective view of the rear end portion of a leading guide rail of this embodiment.

Figures 1, 3:
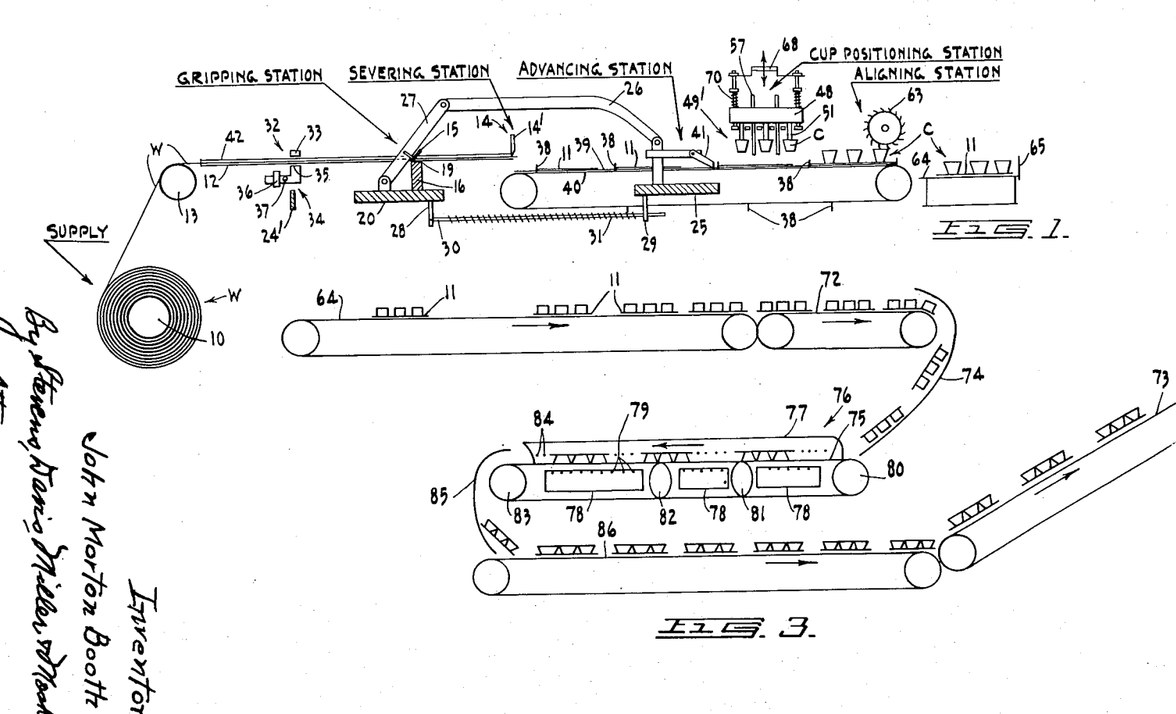
FIGURE 1 is a diagrammatic side elevation view of the machine with the trailing and leading carriages in forward stroke position.
FIGURE 3 is a diagrammatic side elevation view of the cup printed, layer card handling system of this embodiment.

Referring to FIGURE 1, the sequence of operations of the machine is such that a rolled web of flexible material such as cardboard, paperboard and the like, indicated generally at W is led from a rotatably mounted supply reel 10 through a gripping station, a severing station, an advancing station, a cup positioning station and an aligning station.

In the illustrated embodiment, the web is a roll of cardboard previously slit to correct width. The upper surface of the web is coated with a dried, heat activated glue. In the course of advancing through the machine, the web W is cut into blanks or layer cards 11 of predetermined length and a plurality of fluted paper cups indicated generally at C is positioned on the glued upper surface of the layer cards 11 according to a predetermined pattern.

In more detail and in the direction of feed, the web W is led onto the trailing bed 12 (see FIGURE 4), where it is supported, and to the gripping station where the web W is gripped adjacent its leading terminal end.

The trailing bed 12 extends between the guide roll 13 and the cutting knives 14′, and is supported by the channel support members 17 extending lengthwise along opposite sides of the machine forming part of a supporting frame. There are four elongated slots 18 in the trailing bed 12 extending substantially parallel to the longitudinal axis thereof.

Figure 5:
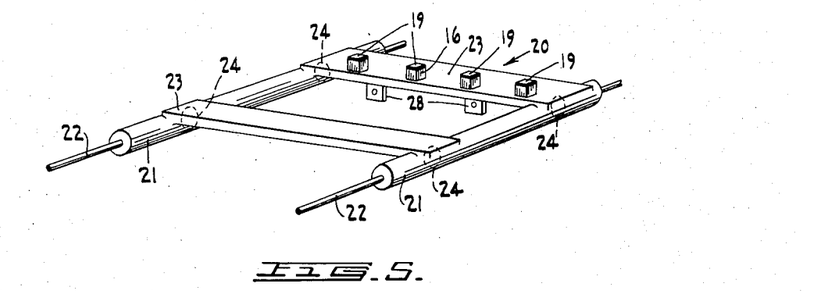
FIGURE 5 is a detailed perspective view of the trailing carriage of this embodiment, again with certain portions of the machine omitted for clarity.

The trailing carriage 20 (see FIGURE 5), which includes the pair of spaced sleeves 21 concentrically disposed about the bearing rods 22 supported from the channel support members 17, is located beneath the trailing bed 12 and is adapted for forward and backward motion or strokes. The sleeves 21 are connected together by the beams 23 and are slidable forward and backward along the bearing rods 22 being supported therefore by the bearings 24. The length of the backward stroke of the trailing carriage 20 is determined by the position of the rear stop 24′ (see FIG. 1), the location of which is adjustable.

Figure 4:
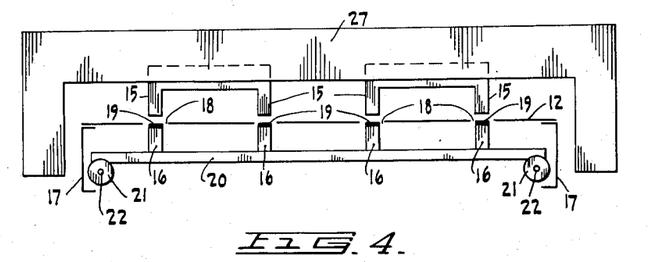
FIGURE 4 is a detailed end elevation view of the trailing carriage of this embodiment with certain portions of the machine omitted for clarity.

The trailing carriage 20 is connected to the leading carriage 25 (see FIGURES 1 and 2) by the connecting link 26 which is pivotally connected at one end to the leading carriage 25 and at its other end to one end of the drive yoke lever 27. The other end of the drive yoke lever 27 is pivotally connected to the trailing carriage 20. Upper jaws 15, made of brass, are secured to the drive yoke lever 27 in alignment with the lower jaws 16 (see FIG- URES 1 and 4) which are mounted on the trailing carriage 20. Each of the lower jaws 16 is slidably disposed within one of the slots 18 in the trailing bed and is tipped with a rubber pad 19 which is flush with or extends slightly above the upper surface of the trailing bed 12.

Each of a pair of spring brackets 28 depending from the trailing carriage 20 is aligned with a corresponding pair of spring brackets 29 depending from the leading carriage 25 (see FIGURE 1 where one of each pair of brackets is shown). Each of a pair of spring rods 30 is secured at one end to one of the brackets 28 and slidably supported toward the other end by the corresponding bracket 29. Each of a pair of coil springs 31 having a predetermined length which is less than the distance between an aligned pair of brackets 28 and 29, (when the two carriages are in position to move together in a forward stroke) and being unsecured at either end is concentrically disposed about one of the spring rods 30. The spring brackets 28 and 29, the spring rods 30 and the coil springs 31 form lower connecting assemblies between the two carriages. It is the function of the trailing carriage 20 with its associated jaws 15 and 16 to grip the web W and to advance or push the web forward so that a predetermined portion of the length thereof is advanced beyond and with respect to the severing station.

Figure 6:
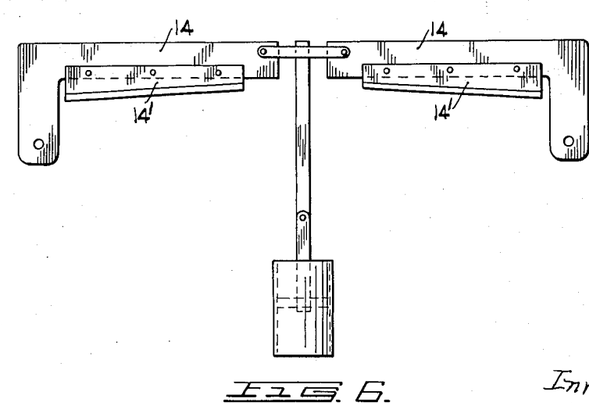
FIGURE 6 is a detailed end elevation view of the cutting station of this embodiment with portions of the machine omitted for clarity.

At the severing station the web W is cut into layer cards by the knives 14'. The advance of the web W is intermittent so that at the end of the forward stroke of the trailing carriage 20, the web pauses while the knives 14 descend to sever the end portion thereof to form a blank layer card 11. The length of the forward stroke of the trailing carriage 20 determines the length of the layer card 11 that will be severed. There are two knife holders 14 (see FIG. 6) and two or more webs W can be advanced through the machine at the same time. When two webs W are advanced through the machine each web is gripped between two of the jaws 15 and 16. For small candy boxes, that is one pound boxes and under, it has been found that four webs can be advanced simultaneously and each of the four webs W is gripped between one of the upper jaws 15 and the lower jaw 16 aligned therewith.

The knives 14' each comprise a detachable blade, tapering from one end thereof to the other, secured to the knife holders 14. The knife holders 14 are pivotally secured to the machine and are adapted to pivot downwardly to sever the end portion of the web W when the forward motion of the web W has stopped.

All basic motions in the machine are actuated by air pressure as will be described in detail later. The leading carriage 25 is driven by an air cylinder and pulls the trailing carriage 20 forward during a forward stroke, through the connecting link 26 and the lever 27. During the forward stroke, the pull exerted by the connecting link 26 causes the lever 27 to pivot forwardly until the upper jaws 15 contact the web W and press the web against the lower jaws 16 at which point the web and the trailing carriage 20 move forward being pulled by the leading carriage 25 for the balance of the forward stroke of the leading carriage 25. At the end of the forward stroke, the web and the two carriages pause, the layer card is severed by the knives 14' and the leading carriage 25 begins its backward stroke.

During the backward stroke, the connecting link 26 pushes against the lever 27 jackknifing it backwardly disengaging the jaws 15 and 16 so that the web is not moved during the backward stroke. At the same time the unsecured ends of the spring rods 30 slide through the spring brackets 29 where they are slidably supported until each coil spring 31 is compressed sufficiently between its corresponding aligned brackets 28 and 29 to force the trailing carriage to move backward until the trailing carriage abuts the rear stop 24'. Any excess backward motion of the leading carriage 25 is then taken up in further compression of the coil springs 31 and further jackknifing of the connecting link 26 and the lever 27.

The leading carriage 25 always travels the same distance, regardless of the length of the layer card to be severed. The stroke of the trailing carriage 20 is varied to feed different lengths of cards. This is accomplished by changing the position of the rear stop 24' thereby determining the length of the web W that will be advanced by the trailing carriage 20 during its forward stroke.

As mentioned, it is the jackknifing action of the lever 27 and the link 26 in the initial stages of the backward stroke when the forward carriage 25 is moving but the coil springs 31 have not been sufficiently compressed to cause the trailing carriage 20 to move, that separates the jaws 15 and 16 so that the web W is released during the backward stroke and does not move during that stroke. As an added precaution against feed-back of the web during the backward stroke of the carriages 20 and 25 a reverse stop assembly 32 is positioned at a suitable point between the guide roll 13 and the severing station. The reverse stop assembly 32 comprises an upper restraining member 33, preferably made of brass, which is disposed substantially in contact with the upper surface of the web W and an associated lower counterweighted friction pawl 34, the upper surface 35 of which is in sliding contact with the lower surface of the web W. During a forward stroke of the carriages 20 and 25 the forward motion of web W presses down against the upper surface 35 of the pawl 34 to offset the upward force transmitted to the upper surface 35 by the counterweight 36 through the fulcrum 37 and there is accordingly no resistance to the forward motion of the web. If, on the other hand, the web tends to move rearwardly during the backward stroke of the carriages 20 and 25 the weight of the counterweight 36 forces the upper surface 35 of the pawl 34 in the direction of the upper restraining member 33 thereby pinching the web W and preventing feed-back of the web.

The severed layer cards 11 fall into the compartments formed between spaced rows of drive lugs 38, disposed in correspondingly spaced elongated slots (not shown) in the leading bed 39. The elongated slots in the leading bed 39 are of predetermined length and extend substantially parallel to the longitudinal axis of the leading bed 39. Vacuum holes (not shown) in the leading bed 39 hold the layer cards 11 flat on the bed. The upper ends of the lugs 38 project a predetermined distance above the upper surface of the leading bed 39 and the lower ends of the lugs 38 are secured to the endless chains 40 (one of which is shown in FIGURE 1) recessed in the leading bed 39. The endless chains 40 move in timed relationship with both the leading carriage 25 and the web W, and are pushed forward one stroke or station for each forward stroke of the leading carriage 25 by the pawls 41 (one of which is shown in FIGURE 1), which are pivotally attached to the leading carriage 25.

The timed relationship prevents an accumulation of error and keeps the operation of the machine on either side of the severing station in phase. There is one pawl 41 for each endless chain 40. During a forward stroke of the leading carriage 25, the pawls 41 push against the immediately forward row of lugs 38, thereby advancing the layer cards one stroke or station. During a backward stroke of the leading carriage 25, the pawls 41 ride up and over the row of lugs 38 following immediately behind the row that was pushed by the pawls 41 during the preceding forward stroke so that the said immediately following row of lugs 38 is in position to be pushed forward during the next forward stroke.

Each web W is kept in proper alignment during travel over the trailing bed 12 by a pair of continuous adjustable, trailing guide rails 42 which extend from the rearmost end of the machine to the severing station and which are disposed along opposite sides of the path of each web. Each guide rail 42 (see FIGURE 8) includes a Teflon tipped notch 43 which, together with the upper surface of the trailing bed 12, forms a slot 44 in which one of the side marginal edges of the web W is slidably disposed.

Similarly, leading adjustable guide rails 45 are attached to the leading bed 39 and are disposed along opposite sides of the path of each row of layer cards 11 served from the web W at the severing station. Although they are not shown in FIGURE 1, the rear end-portion 46 one of leading guide rail 45 is shown in FIGURE 9 and it will be seen that the end-portion 46 flares upwardly to form a scoop which deflects the layer cards 11 downwardly and funnels the side marginal edges thereof into the slots 47.

In this manner the layer cards 11 are advanced to the cup positioning station. A section of the leading bed 39 immediately under and before the cup positioning station is heated to a temperature which will make the predried glue on the upper surface of the layer cards 11 tacky. The length of the heated section of the leading bed 39 is determined by the time required to make the glue tacky. Applicant has found that 2 to 4 seconds is required and that the temperature of the bed should be within the range of 290° F. to 320° F. The time and the temperature will of course vary with the type of glue employed.

The cup positioning station includes two or more mandrel blocks 48, depending on the number of webs W advancing side-by-side simultaneously through the machine. From each mandrel block 48, depend a plurality of mandrel assemblies 49′ (see FIGURES 7a and 7b) arranged according to a predetermined pattern.

Figures 2, 7A, 8:
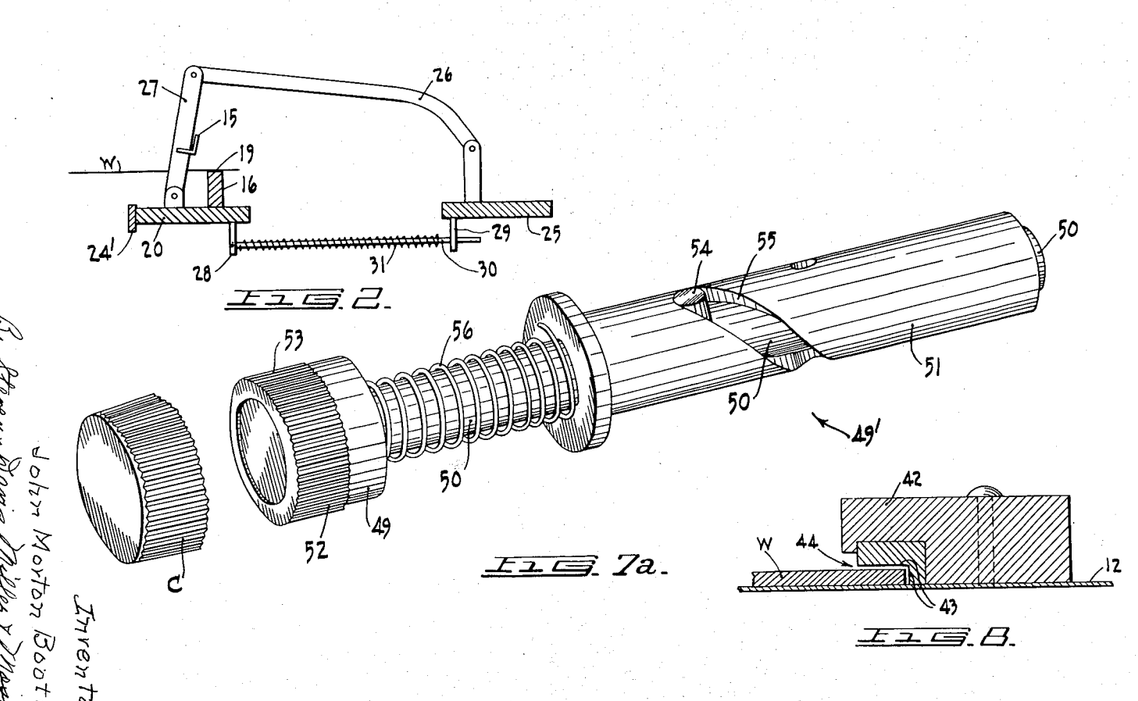
FIGURE 2 is a detailed view of the trailing and leading carriage portion of the mechanism of FIGURE 1 on a slightly larger scale with the trailing and leading carriages in backward stroke position.
FIGURE 7a is a detailed perspective view of a mandrel assembly of this embodiment.
FIGURE 8 is a detailed cross-sectional view of a trailing guide rail of this embodiment.
Figures 6, 7B:
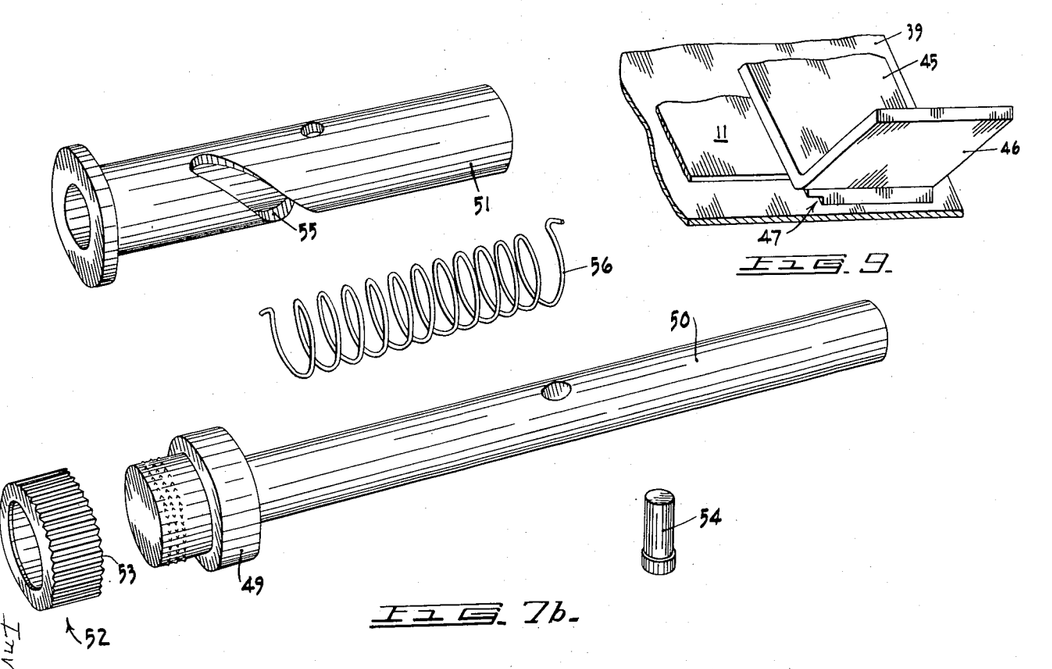

Each mandrel assembly 49′ includes a mandrel 49 secured to the lower end of a reciprocally movable shaft or plunger 50 disposed within but projecting a predetermined distance beyond the lower end of a guide tube 51. A predetermined portion of the outer periphery of the mandrel 49 is preferably of hard rubber 52 with serrations 53. A pin 54 extends outwardly from the plunger 50 and engages a spiral slot 55 of predetermined length formed in the guide tube 51. The width of the slot 55 is substantially equal to the diameter of the pin 54. A coil spring 56 is co-axially disposed about the plunger 50. The upper end of the coil spring 56 bears against the underside of the guide tube 51 and the lower end of the coil spring bears against the upper surface of the mandrel 49. The mandrels 49 are adapted to be inserted within and to frictionally engage the uppermost cup in the nested stack of fluted paper cups C. The stacks of cups C are held in nested relationship by the frictional cohesion which exists between adjacent cups in the stack. The strength of the frictional grip of the mandrels 49 on the uppermost cups should be greater than the cohesion between the cups themselves.

The mandrel assemblies 49′ are removably held in apertures in the mandrel blocks 48 by frictional engagement and their thrust collars (not shown). The apertures in the mandrel blocks 48 locate the mandrel assemblies 49′ according to a predetermined pattern. The mandrel blocks 48 are mounted on a mandrel carriage 48′ (see FIGURE 11) which is moved up and down by an air cylinder. The air cylinder imparts substantially uniform force to all four corners of the mandrel carriage. The length of stroke of the mandrel carriage is controlled by the length of the stroke of the piston in the controlling air cylinder. When a layer card 11 pauses under a mandrel block 48, the air cylinder actuates the mandrel carriage 48′ and the mandrel block 48 descends toward the layer card. When each stack of cups C touches the layer card, each mandrel 49 is forced toward the lower end of its guide tube 51 and the coil springs 56 are compressed. At the same time the plungers 50 move upwardly and the pins 54, following the course of the spiral slots 55, rotate the plungers 50 thereby rotating the mandrels 49. Each stack of cups C held by the mandrels 49 rotate with the mandrels 49 with the exception of the lowermost cup of each stack which are held fast by the glue on the layer card 11. The cohesion between the lowermost cup and the adjacent penultimate cup in each stack is thereby broken. After the downward stroke of the mandrel block 48, the block 48 begins its upward stroke and the lowermost cups are left behind stuck to the layer card 11 in the appropriate pattern determined by the mandrel pattern in the mandrel block. To prevent the printed layer cards 11 from being raised by the mandrel during the upward stroke of the blocks 48, a plurality of strippers 57 (normally 6 strippers for each mandrel pattern will be sufficient) are mounted on each mandrel block 48 disposed at random throughout the mandrel pattern. Each stripper 57 (see FIGURE 10) includes a plunger 58 slidably mounted in a guide sleeve 59 and extending a predetermined distance beyond the lower end thereof. A coil spring is concentrically disposed about the plunger 58 with its lower end bearing against the upper surface of circumferential flange 61 extending outwardly from the plunger 58 toward the lower end thereof and its upper end bears against the lower surface of a flange (not shown) which extends inwardly from the inner surface of the guide sleeve 59 at a predetermined point intermediate its ends. The upper end of the plunger 58 is threaded to receive the nut 62 the adjustment of which adjusts the extent to which the plunger 58 extends beyond the lower end of the guide sleeve 59. As shown in FIGURE 1, the lower end of each stripper extends beyond the lowermost cup of the stacks of nested cups C. During a downward stroke of the mandrel block 48 the strippers 57 reach the layer card 11 to hold the layer card in position before the lowermost cups of the stack of cups C touch the card. Similarly the strippers 57 remain in contact with the layer card 11 after the pattern of cups has been printed on the card and during the initial part of the upward stroke of the mandrel block 48 thereby preventing the layer card 11 from moving upward with the block 48 and completing the separation of the lowermost cups from the stacks of nested cups C. Once the strippers 57 have touched the layer card 11, the coil springs 60 are compressed, and the spring pressure keeps the strippers 57 in contact with the layer card 11 until the spring pressure is released during the upward stroke of the mandrel block 48.

A revolving brush 63 feeds the printed layer cards 11 onto the surge belt 64 by impelling the printed layer cards 11 against an aligning plate 65 which serves to orient the cards on the surge belt 64. Occasional defective cards having one or more cups missing from the printed pattern of cups are manually collected from the surge belt 64 by a sorter who passes them to a spotter. The spotter manually completes the pattern and places the completed cards in a hopper in front of the spotter who at a convenient time places them on the surge belt again.

The machine operates for as many cycles as there are cups in a nest, and then must pause for reloading. The nests of cups C do not always contain the same number of cups and frequently there are some cups remaining on one or more of the mandrels at the beginning of the reloading or cup-load cycle. A manually operable stripper plate 66 is provided to remove these remaining cups (see FIGURES 1 and 11). At the start of the reloading operation, the cup positioning station operator pushes the cup tray 67 which is slidably mounted on one side of the machine at the cup positioning station, into position where it spans the bed of the machine beneath the mandrel block 48 and the operator then manually depresses the stripper plate 66 by pressing down on the handle 68. A plurality of apertures 69 are formed in the stripper plate 66 in corresponding alignment with the mandrel pattern. The apertures 69 are just large enough to clear the mandrels 49 but not the cups C and the cups are stripped from the mandrels and fall into the cup tray 67. The handle 68 is then released and the coil springs 70 return the stripper plate 66 to its normal inoperative position where it is shown in FIGURE 1.

Figures 10, 11:
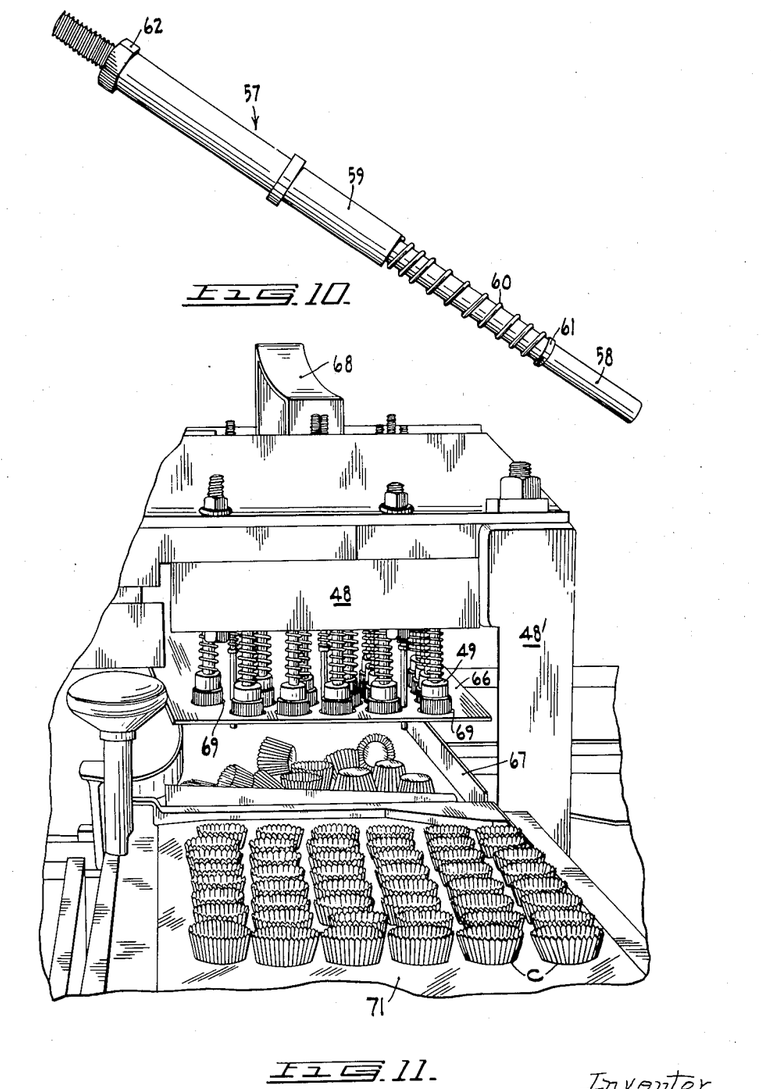
FIGURE 10 is a detailed perspective view of one of the cup positioning station strippers.
FIGURE 11 is a detailed perspective view of the cup positioning station during a reloading operation.

A cup loading board 71 also slidably mounted at the side of the machine and which is adapted to be slid into bed spanning position on top of the cup tray 67, has a plurality of drilled recesses in its upper surface which match the pattern to the mandrels and each of which is adapted to receive a nest of paper cups. In FIGURE 11 the cup loading board 71 is shown with the nests of paper cups C already manually placed in position. After releasing the handle 68, the operator pushes the cup loading board 71 into position spanning the bed of the machine on top of the cup tray 67 and in doing so, the forward edge of the board 71 pushes the stripped cups into a receptacle on the other side of the machine. In being pushed into position, the board 71 trips an air control valve (not shown) which automatically effects a down-up motion of the mandrel block. Each of the mandrels enters the uppermost cup of a nest of cups during the "down" motion and during the "up" motion when the mandrels 49 are raised, they retain their frictional grip on the nests of cups thus accomplishing "reloading." When the reloading cycle has been completed, the cup loading board 71 is manually withdrawn and it is linked to the cup tray 67 so that the cup tray comes with it. In being withdrawn, the cup loading board 71 trips another air control valve automatically restarting the machine.

No layer cards 11 are printed with cups during the reloading operation and accordingly the feed of printed layer cards to the surge belt 64 is intermittent. At the packing belt where the chocolates are placed in the cups, the supply of printed layer cards 11 must be constant. To adjust the intermittent supply to the surge belt 64 with the constant demand at the packing belt (see FIGURE 3) the surface of the surge belt is made smooth and the surge belt 64 is disposed in end-to-end relationship with a comparatively rough surfaced timing belt 72. The speed of the surge belt 64 is greater than that of the timing belt 72. The printed layer cards accumulate on the surge belt 64, which slips under them, due to the slower speed of the timing belt 72 and because the cards cannot slide on the rough surface of the timing belt 72. While the machine is stopped for reloading the accumulated reserve of printed layer cards on the surge belt dwindles, but it builds up again during the next printing cycle so that there is a constant feed from the surge belt 64 to the timing belt 72. To allow time for the packers to place the chocolates in the cups, the printed layer cards should be spaced and this is accomplished by making the speed of the packing lift belt 73 greater than that of the timing belt 72.

From the timing belt 72 the printed layer cards 11 fall into the chute 74 in which they are inverted and from which they are passed to the V-belts 75 which carry the inverted layer cards into the steam chamber 76 which includes the hood 77 and the steamer 78 which is in three sections. The steamer 78 has a plurality of apertures 79, each of which is approximately 3/16 of an inch in diameter, in the top thereof which directs steam into the cups causing them to expand thereby making it easier for the packers to insert chocolates in the cups. Any condensate which collects in the cups will likely cause the discolouration of the candies. Inverting the cups before they pass over the steam chamber, largely eliminates any condensate being blown into the cups. The V belts 75 extending between the grooved pulleys 80, 81, 82 and 83 are offset so that the cups resting on the belts over the first section of the steamer 78 are between belts when over the next section of the steamer 78. Any tendency of the V belts 75 to restrain the cups from opening under the influence of the steam is substantially eliminated. The total length of the steam chamber is determined by the time required to sufficiently steam the cups to cause them to open. Applicant has found that a steam chamber roughly twenty feet in length is sufficient. The steam drifts convectionally through the apertures 79 into contact with the cups and is removed from the chamber through an exhaust system (not shown) in the hood 77. Although the hood 77 substantially encloses the top and sides of the steam chamber, part of it has been cut away in FIGURE 3 for clarity.

The effect of the exhaust in the steam chamber 76 draws air into the chamber through the air holes 84 located along the sides of the hood 77 approximately at the level of the cards. It has been found that the air drawn in through the air holes 84, mixes with the steam immediately above the layer cards causing the cards to curl slightly upwardly at their ends. The slightly curled cards give the packers better access to the cups during packing. The curl disappears when the cards dry. When the layer cards come out of the steam chamber 76 the cups are too hot to receive candies immediately.

From the steam chamber 76 the cards pass into chute 85 which again inverts the cards and drops them cup-side-up on the cooling belt 86. In the illustrated embodiment the cooling belt is approximately twenty feet long and it has been found that the cups passing along this belt cool sufficiently at room temperature to permit packing. From the cooling belt 86 the cards pass to the lift belt 73 which takes the cards to the packing belt (not shown) where the chocolates are inserted in the cups.

The surge belt 64, the timing belt 72, the cooling belt 86 and the lift belt 73 are all driven by a common adjustable drive (not shown) and by varying the pitch diameter of the sprocket for any belt, the speed of that belt can be varied.

Figure 12:
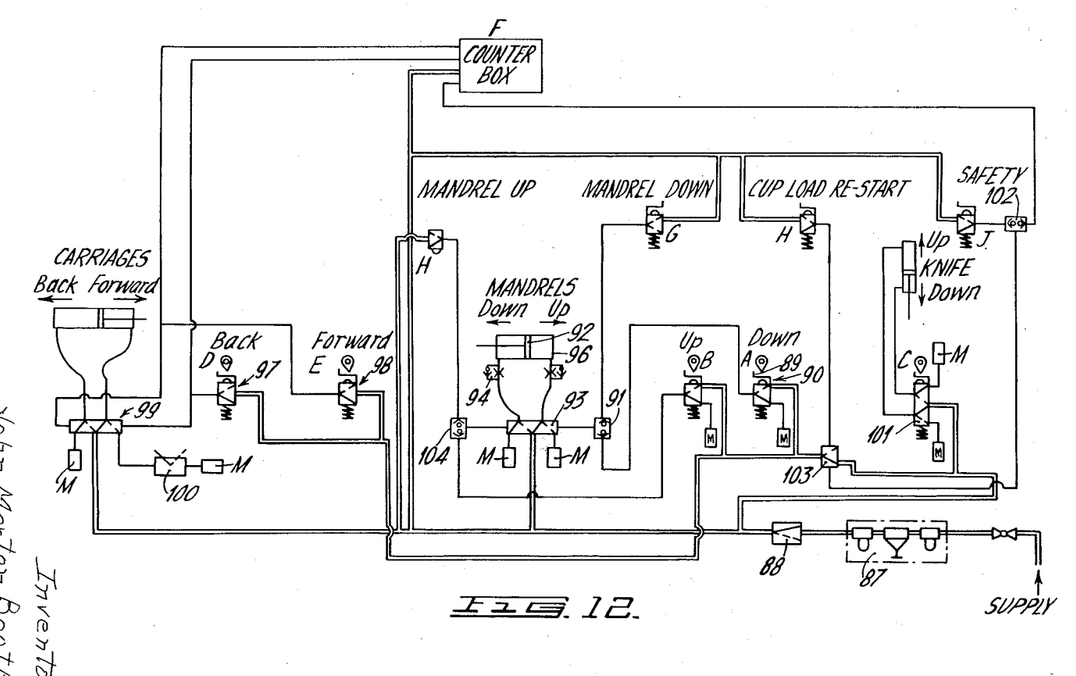
FIGURE 12 is a schematic diagram of the air system of this embodiment.

As mentioned previously, all basic motions in the machine are produced with air cylinders. Referring to FIGURE 12, air is fed to the machine through the air filter and lubrication control 87, and through the safety valve 88. The safety valve is a device to remove air pressure from all parts of the machine in an emergency. The basic supply lines are shown in FIGURE 12 with solid heavy lines.

The drive that powers the surge belt 64 also rotates, the primary timing shaft (not shown) in the machine, through a chain and sprocket connection. The cams A, B and C are fixed to this shaft in phase relationship such that they actuate the "Mandrel Down," "Mandrel Up" and "Severing" strokes in correct sequence.

Considering the "Mandrel Down" stroke first, the cam A, rotates once with each rotation of the primary timing shaft. Thus it depresses the trip lever 89 on the signal valve, 90 each time the shaft turns. This sends a pulse of air through the T valve 91, to one side of the shuttle in the 4-way valve, 93. The T valves allow the passage of signals from two different sources to a common objective, but will not allow loss of the signal by passage from one source to the other.

The pulse of air from the signal valve 90 blows the shuttle in the 4-way valve, 93, to one side, causing ports in the valve 93 to admit air to one side of the piston 92 in the mandrel air cylinder 96 and to exhaust air from the other side through the speed control, 94, and the muffler M, thus causing the mandrels to depress.

Similarly a pulse actuated by the timing cam, B, by blowing the shuttle in the 4-way valve, 93, in the other direction, causes the mandrels to lift. Thus a timed up and down motion of the mandrels is accomplished.

A secondary timing shaft (not shown) is attached to the mandrel carriage 48' on which the mandrel block 48 is mounted. The secondary timing shaft makes a partial rotation in one direction when the mandrels depress and a corresponding partial rotation in the opposite direction when the mandrels rise. The cams, D and E are fixed to this shaft in such positions that they trip the signal valves, 97 and 98. These signal valves are of the type that will be tripped by a cam passing over them in one direction, but will not be tripped when the cam returns. The pulses from these valves acting on a shuttle in the 4-way valve, 99, cause sequenced "Back" and "Forward" motions of the leading carriages 25 in the same manner as the pulses from cams A and B caused the up and down motions of the mandrel carriage. The valve, 100, is a device for gently decelerating the forward stroke of the carriages 20 and 25.

As shown in FIGURE 12, the "Mandrel Down" stroke trips the carriage back stroke and the "Mandrel Up" stroke sends the carriages 20 and 25 forward. When the carriages are safely forward (having pulled the web W with them), the cam C, on the primary timing shaft actuates the knives 14' "Down," then "Up" by depressing and then releasing the shuttle of the 4-way valve, 101. Thus the basic operating cycle of the machine is accomplished.

Various other devices are included for other purposes. For instance, the basic cycle must be interrupted for reloading. This is accomplished by the counter F, which operated by the "Forward" and "Back" pulses from cams D and E, "counts" the number of cups deposited by rotating a ratchet wheel one notch each cycle. This wheel has as many notches as there are cups to a nest. When this number of cycles has been completed, a cam on the Ratchet Wheel "cuts" out the basic operating cycle by sending a pulse through the T valve, 102, to one end of the shuttle in the 3-way valve, 103, thus causing it to vent the air supply to all cam signal valves. The mandrels are stopped in their "Up" position.

The cup loading board 71 is then inserted in the machine, tripping signal valve, G, which in turn sends a pulse through the T valve, 91, to the 4-way valve, 93, causing the mandrels to depress into the cups. This down stroke of the mandrels causes the signal valve H, to contact the cup loading board 71 sending a pulse through the T valve, 104, to the opposite end of the shuttle in the 4-way valve, 93, causing the mandrels to return to the "Up" position.

The cup loading board 71 is then withdrawn. A small lug (not shown) linked to this board then trips the signal valve H, restarting the basic operating cycle by blowing the shuttle in the 3-way valve, 103, to its "Air Through" position.

The safety valve, J, ensures that if the cup loading board 71 is accidentally inserted into the machine while it is running, the air supply is cut off. Its pulse accomplishes this in the same manner as a pulse from the counter F.

I claim:

1. Apparatus for severing layer cards from a web source of layer card material of predetermined width having a heat activated, predried glue on the upper surface thereof and for positioning a plurality of containers on the severed layer cards according to a predetermined pattern comprising, a trailing bed, a trailing carriage, movably mounted in association with, and moving in backward and forward strokes relative to the trailing bed in the direction of the longitudinal axis thereof, a severing station located adjacent the forward end of the trailing bed, a leading bed mounted in end-to-end relationship with the trailing bed, a leading carriage movably mounted in association with the leading bed and moving in backward and forward strokes relative thereto in the direction of the longitudinal axis thereof, said trailing carriage being connected to said leading carriage, said trailing carriage gripping and advancing said web along said trailing bed in regular intermittent steps, said severing station acting to to sever layer cards of predetermined length from the forward end of said web during the intervals between steps in the advance of the web, said leading carriage co-operating with said leading bed to advance the severed layer cards one behind the other in spaced relationship in intermittent steps along the leading bed, the intermittent steps of the advance of the severed layer cards being in timed relationship with the intermittent steps of the advance of the web, means disposed in association with said leading bed and acting to make the predried glue on the upper surface of the layer cards tacky, and means for depositing a plurality of containers on the glue tacky surfaces of the layer cards.

2. Apparatus for severing layer cards from a web source of layer card material of predetermined width having a heat activated, predried glue on the upper surface thereof and for positioning a plurality of containers on the severed layer cards according to a predetermined pattern comprising a frame, a trailing bed mounted on said frame, a plurality of elongated slots in the trailing bed extending a predetermined distance therein substantially parallel to the longitudinal axis thereof, a trailing carriage disposed beneath said trailing bed, said trailing carriage being movably mounted on said frame and adapted for backward and forward strokes relative to the trailing bed in the direction of the longitudinal axis thereof, a plurality of lower jaws mounted on the trailing carriage in alignment with the elongated slots in the trailing bed, a severing station located adjacent the forward end of the trailing bed, a leading bed mounted on said frame in end-to-end relationship with the trailing bed, a plurality of elongated slots in the leading bed extending a predetermined distance therein substantially parallel to the longitudinal axis thereof, a leading carriage disposed beneath said leading bed, said leading carriage being movably mounted on said frame and adapted for backward and forward strokes relative to the leading bed in the direction of the longitudinal axis thereof, connecting links connecting the trailing carriage to the leading carriage, a plurality of upper jaws attached to the connecting links and disposed above the trailing bed in alignment with the elongated slots therein, said upper and lower jaws being adapted to grip and to advance said web along said trailing bed in regular intermittent steps, said severing station being adapted to sever layer cards of predetermined length from the forward end of said web during the intervals between steps in the advance of the web, said leading carriage being adapted to co-operate with said leading bed to advance the severed layer cards one behind the other in spaced relationship in intermitent steps along the leading bed, the intermittent steps of the advance of the severed layer cards being in timed relationship with the intermittent steps of the advance of the web, means disposed in association with said leading bed and adapted to make the predried glue on the upper surface of the layer cards tacky, and means for depositing a plurality of containers on the glue tacky surfaces of the layer cards.

3. Apparatus for severing layer cards from a web source of layer card material of predetermined width having a heat activated predried glue on the upper surface thereof and for positioning a plurality of containers on the severed layer cards according to a predetermined pattern comprising a frame, a trailing bed mounted on said frame, a plurality of elongated slots in the trailing bed extending a predetermined distance therein substantially parallel to the longitudinal axis thereof, a trailing carriage disposed beneath said trailing bed, said trailing carriage being movably mounted on said frame and adapted for backward and forward strokes relative to the trailing bed in the direction of the longitudinal axis thereof, a plurality of lower jaws mounted on the trailing carriage and disposed beneath the trailing bed in alignment with the elongated slot therein, a severing station located adjacent the forward end of the trailing bed at least one cutting knife mounted at said severing station, a leading bed mounted on said frame in end-to-end relationship with the trailing bed, a plurality of elongated slots in the leading bed extending a predetermined distance therein substantially parallel to the longitudinal axis thereof, a leading carriage disposed beneath said leading bed, said leading carriage being movably mounted on said frame and adapted for backward and forward strokes relative to the leading bed in the direction of the longitudinal axis thereof, a drive yoke lever pivotally connected at one end to the trailing carriage, a connecting link pivotally connected at one end to the leading carriage and at the other end to the drive yoke lever, a plurality of upper jaws attached to the drive yoke lever and disposed above the trailing bed in alignment with the elongated slots therein, said upper and lower jaws being adapted firstly to grip and to advance said web a predetermined distance along said trailing bed during forward strokes of the trailing carriage and secondly to release said web during backward strokes of the trailing carriage, whereby said web is advanced along said trailing bed relative to said severing station in regular intermittent steps said knife at said severing station being adapted to sever layer cards of predetermined length from the forward end of said web during the intervals between steps in the advance of the web, an endless chain recessed in each elongated slot in the leading bed, a plurality of spaced lugs extending upwardly from each endless chain to form spaced rows of lugs in transverse alignment relative to the longitudinal axis of the leading bed, said spaced rows of lugs cooperating with said leading bed to form compartments into which the severed layer cards fall, a plurality of pawls disposed above said leading bed and pivotally connected to said leading carriage in alignment with said endless chains, said pawls being adapted firstly to push against the immediately forward spaced row of lugs during forward strokes of the leading carriage and secondly to ride up and over the lugs during backward strokes of the leading carriage whereby said endless chains are advanced in intermittent steps whereby said severed layer cards are advanced one behind the other in spaced relationship in intermittent steps along the leading bed, the intermittent steps of the advance of the severed layer cards being in timed relationship with the intermittent steps of the advance of the web, means disposed in association with said leading bed and adapted to make the predried glue on the upper surfaces of the layer cards tacky and means for depositing a plurality of containers on the glue tacky surfaces of the layer cards.

4. Apparatus of severing layer cards from a web source of layer card material of predetermined width having a heat activated, predried glue on the upper surface thereof and for positioning a plurality of containers on the severed layer cards according to a predetermined pattern comprising a frame, a trailing bed mounted on said frame, a plurality of elongated slots in the trailing bed extending a predetermined distance therein substantially parallel to the longitudinal axis thereof, a trailing carriage disposed beneath said trailing bed, said trailing carriage being movably mounted on said frame and adapted for backward and forward strokes relative to the trailing bed in the direction of the longitudinal axis thereof, a plurality of lower jaws mounted on the trailing carriage and disposed beneath the trailing bed in alignment with the elongated slots therein, a severing station located adjacent the forward end of the trailing bed, at least one cutting knife mounted at said severing station, a leading bed mounted on said frame in end-to-end relationship with the trailing bed, a plurality of elongated slots in the leading bed extending a predetermined distance therein substantially parallel to the longitudinal axis thereof, a leading carriage disposed beneath said leading bed, said leading carriage being movably mounted on said frame and adapted for backward and forward strokes relative to the leading bed in the direction of the longitudinal axis thereof, a drive yoke lever pivotally connected at one end to the trailing carriage, a connecting link pivotally connected at one end to the leading carriage and at the other end to the drive yoke lever, a plurality of upper jaws attached to the drive yoke lever and disposed above the trailing bed in alignment with the elongated slots therein, said upper and lower jaws being adapted firstly to grip and to advance said web a predetermined distance along said trailing bed during forward strokes of the trailing carriage and secondly to release said web during backward strokes of the trailing carriage, whereby said web is advanced along said trailing bed relative to said severing station in regular intermittent steps, said knife at said severing station being adapted to sever layer cards of predetermined length from the forward end of said web during the intervals between steps in the advance of the web, an endless chain recessed in each elongated slot in the leading bed, a plurality of spaced lugs extending upwardly from each endless chain to form spaced rows of lugs in transverse alignment relative to the longitudinal axis of the leading bed, said spaced rows of lugs co-operating with said leading bed to form compartments into which the severed layer cards fall, a plurality of pawls disposed above said leading bed and pivotally connected to said leading carriage in alignment with said endless chains, said pawls being adapted firstly to push against the immediately forward spaced row of lugs during forward strokes of the leading carriage and secondly to ride up and over the lugs during backward strokes of the leading carriage whereby said endless chains are advanced in intermittent steps whereby said severed layer cards are advanced one behind the other in spaced relationship in intermittent steps along the leading bed, the intermittent steps of the advance of the severed layer cards being in timed relationship with the intermittent steps of the advance of the web, heating means disposed in association with said leading bed and adapted to heat the layer cards and thereby to make the predried glue on the upper surfaces thereof tacky, at least one mandrel carriage mounted on said frame in association with said leading bed, a mandrel block mounted on said mandrel carriage, a plurality of mandrel assemblies mounted in said mandrel block according to a predetermined pattern, said mandrel carriage being adapted to move said mandrel block through up and down controlled strokes, said mandrel assemblies each being adapted a deposit a single container on the glue tacky upper surface of at least one layer card during each up and down stroke of the mandrel block.

5. Apparatus according to claim 3 in which the drive yoke lever and the connecting link jackknife during backward strokes of the leading and trailing carriages to disengage the upper and lower jaws whereby the web is released during said backward strokes.

6. Apparatus according to claim 3 including at least one connecting assembly comprising a spring bracket depending from the trailing carriage, a corresponding and aligned spring bracket depending from the leading carriage, a spring rod connected at one end to one of said spring brackets and slidably supported toward its other end by the other of said spring brackets, and a coil spring of predetermined strength and length concentrically disposed about said spring rod, whereby backward motion of the leading carriage is imparted to the trailing carriage only after a predetermined compression of the coil spring, whereby the drive yoke lever and the connecting link are free to jackknife to disengage the upper and lower jaws from the web before the trailing carriage commences its backward stroke.

7. Apparatus according to claim 1 in which all basic motions of the moving parts thereof are actuated by air pressure.

8. Apparatus according to claim 1 in which the trailing bed forms a guide path for the web and in which the leading bed forms a guide path for the severed layer cards.

9. Apparatus according to claim 1 including a plurality of trailing guide rails disposed along the upper surface of the trailing bed and a plurality of leading guide rails disposed along the upper surface of the leading bed, said trailing guide rails serving to keep the web in proper alignment during the advance thereof along the trailing bed and said leading guide rails serving to keep the several layer cards in proper alignment during the advance thereof along the leading bed.

10. Apparatus according to claim 1 including apertures in said leading bed and means for maintaining a negative air pressure at said apertures whereby said severed layer cards are held flat on the leading bed.

11. Apparatus according to claim 1 including a rear stop the position of which is adjustable whereby the length of the stroke of the rear carriage is adjustable to predetermine the length of the layer cards severed at the severing station.

12. Apparatus according to claim 1 including a reverse stop adapted to prevent feed back of the web during the backward strokes of the trailing carriage.

13. Apparatus according to claim 1 including a source of air pressure, a plurality of air cylinders, a plurality of valves and a plurality of cams, said cams being adapted to open and shut the valves in timed sequence to actuate the air cylinders to impart the forward and backward stroke motions to the carriages and the up and down stroke motions of the mandrel carriage.

14. Apparatus according to claim 1 including a smooth surfaced surge belt, means for directing the severed layer cards with the containers positioned thereon onto the surge belt, and a rough surfaced timing belt disposed in end-to-end relationship with the surge belt so that the layer cards pass from the surge belt to the timing belt, said surge belt moving at a predetermined greater speed than that of the timing belt whereby the layer cards move onto the surge belt faster than they move from the surge belt to the timing belt and thereby the layer cards accumulate on the surge belt to compensate for intermittent feed thereto and to accomplish a constant feed to the timing belt for at least a predetermined time.

15. Chocolate packaging apparatus adapted to sever layer cards from a web source of layer card material of predetermined width having a heat activated, predried glue on the upper surface thereof and to position a plurality of fluted paper cups on the severed layer cards according to a predetermined pattern comprising a frame, a trailing bed mounted on said frame, a plurality of elongated slots in the trailing bed extending a predetermined distance therein substantially parallel to the longitudinal axis thereof, a trailing carriage disposed beneath said trailing bed, said trailing carriage being movably mounted on said frame and adapted for backward and forward strokes relative to the trailing bed in the direction of the longitudinal axis thereof, a plurality of lower jaws mounted on the trailing carriage and disposed beneath the trailing bed in alignment with the elongated slots therein, a severing station located adjacent the forward end of the trailing bed, at least one cutting knife mounted at said severing station, a leading bed mounted on said frame in end-to-end relationship with the trailing bed, a plurality of elongated slots in the leading bed extending a predetermined distance therein substantially parallel to the longitudinal axis thereof, a leading carriage disposed beneath said leading bed, said leading carriage being movably mounted on said frame and adapted for backward and forward strokes relative to the leading bed in the direction of the longitudinal axis thereof, a drive yoke lever pivotally connected at one end to the trailing carriage, a connecting link pivotally connected at one end to the leading carriage and at the other end to the drive yoke lever, a plurality of upper jaws attached to the drive yoke lever and disposed above the trailing bed in alignment with the elongated slots therein, said upper and lower jaws being adapted firstly to grip and to advance said web a predetermined distance along said trailing bed during forward strokes of the trailing carriage and secondly to release said web during backward strokes of the trailing carriage, whereby said web is advanced along said trailing bed relative to said severing station in regular intermittent steps, said knife at said severing station being adapted to sever layer cards of predetermined length from the forward end of said web during the intervals between steps in the advance of the web, an endless chain recessed in each elongated slot in the leading bed, a plurality of spaced lugs extending upwardly from each endless chain to form spaced rows of lugs in transverse alignment relative to the longitudinal axis of the leading bed, said spaced rows of lugs cooperating with said leading bed to form compartments into which the severed layer cards fall, a plurality of pawls disposed above said leading bed and pivotally connected to said leading carriage in alignment with said endless chains, said pawls being adapted firstly to push against the immediately forward spaced row of lugs during forward strokes of the leading carriage and secondly to ride up and over the lugs during backward strokes of the leading carriage whereby said endless chains are advanced in intermittent steps whereby said severed layer cards are advanced one behind the other in spaced relationship in intermittent steps along the leading bed, the intermittent steps of the advance of the severed layer cards being in timed relationship with the intermittent steps of the advance of the web, heating means disposed in association with said leading bed and adapted to heat the layer cards and thereby to make the predried glue on the upper surfaces thereof tacky, at least one mandrel carriage mounted on said frame in association with said leading bed, a mandrel block mounted on said mandrel carriage, a plurality of mandrel assemblies mounted in said mandrel block according to a predetermined pattern, said mandrel carriage being adapted to move said mandrel block through up and down controlled strokes, said mandrel assemblies each being adapted to deposit a single paper cup on the glue tacky upper surface of at least one layer card during each up and down stroke of the mandrel block, a smooth surfaced surge belt, means for directing the layer cards with the paper cups positioned thereon onto the surge belt, a rough surfaced timing belt disposed in end-to-end relationship with the surge belt so that the layer cards pass from the surge belt to the timing belt, said surge belt moving at a predetermined greater speed than that of the timing belt whereby the layer cards move onto the surge belt faster than they move from the surge belt to the timing belt and thereby the layer cards accumulate on the surge belt to compensate for intermittent feed thereto and to accomplish a constant feed to the timing belt for at least a predetermined time, a first chute adapted to invert the layer cards as they pass from the timing belt, a steam chamber housing a steamer, a plurality of longitudinally extending V-belts adapted to convey the inverted layer cards through the steam chamber, a plurality of apertures in the steamer through which steam is convectionally directed into the paper cups to cause them to expand, a cooling belt, and a second chute adapted to invert the layer cards passing from the steam chamber and drop the layer cards cup-side-up on the cooling belt.

16. Apparatus according to claim 15 in which the V-belts are off-set whereby paper cups in contact with the V-belt in one section of the steam chamber are between belts in another section of the steam chamber thereby substantially eliminating any tendency of the V-belts to restrain the paper cups from expanding under the influence of the steam.

17. Apparatus according to claim 15 in which the steam chamber includes a plurality of apertures, and air is drawn into the chamber through the apertures and mixed with the steam immediately above the layer cards whereby the layer cards are caused to curl.

18. The method of preparing containers for chocolates or the like comprising the steps of severing layer cards from a web of layer card material, one surface of which is coated with a dried glue, causing the glue to become tacky, depositing a plurality of fluted paper cups on the glue tacky surface of the severed layer cards and allowing said glue to dry to adhere the paper cups to the layer cards and thereafter steam treating the layer cards with the fluted paper cups adhered thereto thereby to cause expansion of the open end of the cups.

19. The method of positioning a plurality of fluted paper cups according to a predetermined pattern on a succession of layer cards or the like comprising the steps of advancing a web of layer card material of predetermined width in regular intermittent steps, said web having one surface thereof coated with a dried glue, severing a layer card of predetermined length from the forward end of said web during the interval between steps in the advance of the web, advancing the severed layer cards one behind the other, in spaced relationship, in intermittent steps which are in timed relationship with the intermittent, advancing steps of the web, causing the glue on the layer cards to become tacky, depositing a plurality of fluted paper cups according to said predetermined pattern on the glue tacky surface of at least one of said layer cards during the interval between steps in the advance of the layer cards, allowing said glue to dry to adhere the paper cups to the layer cards and thereafter steam treating the layer cards with the fluted paper cups adhering thereto thereby to cause the open ends of the cups to expand.

20. The method of claim 19 in which the method of steam treatment includes the steps of inverting the layer cards so that the open ends of the cups face downwardly, and thereafter allowing steam to drift convectionally into contact with the cups.

21. The method of claim 19 in which the method of steam treatment includes the steps of inverting the layer cards so that the open ends of the cups face downwardly, and thereafter allowing steam to drift convectionally into contact with the paper cups for a predetermined length of time sufficient to cause the open ends of the cups to expand while, at the same time, air is mixed with the steam immediately above the layer cards to cause the layer cards to curl slightly at their ends whereby better access is had to the cups for packing purposes.

22. The method of claim 21 in which the layer cards are re-inverted after being steamed and thereafter allowed to cool.

23. The method of claim 21 in which the inverted layer cards are carried on a succession of moving surfaces during steam treatment such that the cups on the surfaces during one part of the steam treatment are between surfaces during another part of the steam treatment whereby any tendency on the part of the surfaces to restrain the expansion of the cups is substantially eliminated.

24. A method of packaging chocolates in fluted paper cups fixed in a predetermined pattern to candy box layer cards, which comprises the steps of advancing a web of layer card material of predetermined width in regular intermittent steps, said web having one surface thereof coated with a dried glue severing a layer card of predetermined length from the forward end of said web during the interval between steps in the advance of the web, advancing the several layer cards, one behind the other, in spaced relationship, in intermittent steps which are in timed relationship with the intermittent, advancing steps of the web, causing the glue on the layer cards to become tacky, depositing a plurality of cups according to said predetermined pattern on at least one of said layer cards during the interval between steps in the advance of the layer cards, allowing said glue to dry to adhere the cups to the layer cards, inverting the layer cards so that the open ends of the cups face downwardly, allowing steam to drift convectionally into contact with the inverted paper cups for a predetermined length of time sufficient to cause the open ends of the cups to expand while, at the same time, air is mixed with the steam immediately above the layer cards to cause the layer cards to curl slightly at their ends, reinverting the layer cards, and thereafter cooling the layer cards and transporting them to a packing line where chocolates are placed in the cups.

25. The method of claim 24 in which the inverted layer cards are carried on a succession of moving surfaces such that the cups on the surfaces during one part of the steam treatment are between surfaces during another part of the steam treatment whereby any tendency on the part of the surfaces to restrain the expansion of the cups is substantially eliminated.

26. The method of preparing containers for chocolates or the like comprising the steps of severing layer cards from a web of layer card material, one surface of which is coated with a dried glue, causing the glue to become tacky, depositing a plurality of fluted paper cups on the glue tacky surface of the severed layer cards and allowing said glue to dry to adhere the paper cups to the layer cards carrying the layer cards successively on a first moving surface and on a second moving surface, the respective speeds of said surfaces being timed to cause the layer cards to accumulate on the first moving surface whereby an interrupted flow of layer cards to the first moving surface does not affect the constant flow of layer cards from the first moving surface to the second moving surface for at least a predetermined length of time and thereafter steam treating the layer cards with the fluted paper cups adhered thereto thereby to cause expansion of the open end of the cups.

27. Apparatus for positioning a plurality of containers on layer cards of the like including a first support, a second support, means for advancing a web of layer card material along said first support, a carriage associated with said first support for movement in forwardly and rearwardly directed strokes along the longitudinal axis of the latter, means associated with said first carriage for gripping said web of card layer material and advancing a length of same upon a forward stroke of said carriage, and means for varying the length of stroke of said carriage, thereby to vary the length of card layer material advanced upon each forward stroke of said carriage, and means sequentially applying forwardly and rearwardly directed forces to said carriage to cause reciprocation thereof, the upper surface of said web being coated with a dry glue, cutting means for severing the layer cards from the forward end of said web, means for advancing said severed layer cards along said second support, means to cause the dry glue to become tacky, and means for depositing a plurality of containers on the glued tacky surface of the layer cards.

References Cited by the Examiner

UNITED STATES PATENTS

| | | | |
|---|---|---|---|
| 2,524,945 | 10/1950 | Von Hoff | 156—320 |
| 2,879,698 | 3/1959 | Triolo | 93—36.6 |
| 3,035,382 | 5/1962 | Lemelson | 53—184 |
| 3,050,914 | 8/1962 | Morgan | 53—22 XR |
| 3,145,514 | 8/1964 | Steffey | 53—3 |

FRANK E. BAILEY, *Primary Examiner.*

BERNARD STICKNEY, *Examiner.*